(12) United States Patent
Thiamtong et al.

(10) Patent No.: US 9,030,170 B2
(45) Date of Patent: May 12, 2015

(54) METHOD AND DEVICE FOR CONTROLLING HYBRID FUNCTIONS IN A MOTOR VEHICLE

(75) Inventors: Vasoontara Thiamtong, Wolfsburg (DE); Benjamin Krafzig, Lehre (DE); Thomas Mueller, Kassel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 32 days.

(21) Appl. No.: 13/511,310

(22) PCT Filed: Nov. 10, 2010

(86) PCT No.: PCT/EP2010/006848
§ 371 (c)(1),
(2), (4) Date: Oct. 11, 2012

(87) PCT Pub. No.: WO2011/066899
PCT Pub. Date: Jun. 9, 2011

(65) Prior Publication Data
US 2013/0030623 A1    Jan. 31, 2013

(30) Foreign Application Priority Data
Dec. 5, 2009 (DE) .......................... 10 2009 057 174

(51) Int. Cl.
| H01M 10/50 | (2006.01) |
| H02J 7/00 | (2006.01) |
| B60W 10/26 | (2006.01) |
| B60W 10/08 | (2006.01) |

(Continued)

(52) U.S. Cl.
CPC *B60W 10/26* (2013.01); *B60K 6/48* (2013.01); *B60K 2001/005* (2013.01); *B60W 10/08* (2013.01); *B60W 20/00* (2013.01); *B60W 30/182* (2013.01); *B60W 2510/246* (2013.01); *Y02T 10/6221* (2013.01); *B60L 11/1874* (2013.01); *B60L 11/1875* (2013.01); *Y02T 10/7005* (2013.01); *Y02T 10/705* (2013.01)

(58) Field of Classification Search
CPC .............. Y02T 10/7005; Y02T 10/705; Y02T 10/6291; B60W 30/182; B60W 20/102; B60L 2240/425; B60L 11/1861; H01M 10/5016

See application file for complete search history.

(56) References Cited

U.S. PATENT DOCUMENTS 6,163,135 A    12/2000  Nakayama et al.
6,215,198 B1 *  4/2001  Inada et al. ................. 290/40 C (Continued)

FOREIGN PATENT DOCUMENTS

| DE | 102 94 242 | 9/2003 |
| DE | 10294242 | 9/2003 |

(Continued)

OTHER PUBLICATIONS

Espacenet Machine Translation of DE102007020935 "Zillmer".*

(Continued)

*Primary Examiner* — Helal A Algahaim
*Assistant Examiner* — Paul Castro
(74) *Attorney, Agent, or Firm* — Pearl Cohen Zedek Latzer Baratz LLP

(57) ABSTRACT

In a method and a device for controlling hybrid functions in a motor vehicle, including at least one control unit, hybrid functions of a motor vehicle are controlled by the control unit, the control unit switching off at least one hybrid function above a predetermined battery temperature.

13 Claims, 2 Drawing Sheets

(51) Int. Cl.
*B60W 30/182* (2012.01)
*B60L 11/18* (2006.01)
*B60K 6/48* (2007.10)
*B60K 1/00* (2006.01)
*B60W 20/00* (2006.01)

(56) References Cited

U.S. PATENT DOCUMENTS

| | | | |
|---|---|---|---|
| 6,271,648 B1* | 8/2001 | Miller | 320/150 |
| 6,799,650 B2* | 10/2004 | Komiyama et al. | 180/65.245 |
| 6,870,336 B2 | 3/2005 | Murakami et al. | |
| 2002/0014869 A1* | 2/2002 | Omata et al. | 318/139 |
| 2002/0195288 A1 | 12/2002 | Komiyama et al. | |
| 2003/0088343 A1 | 5/2003 | Ochiai et al. | |
| 2003/0118891 A1* | 6/2003 | Saito et al. | 429/62 |
| 2003/0169001 A1 | 9/2003 | Murakami et al. | |
| 2005/0083017 A1 | 4/2005 | Suzuki | |
| 2005/0155839 A1* | 7/2005 | Banks et al. | 194/302 |
| 2008/0183348 A1 | 7/2008 | Arita et al. | |
| 2008/0280192 A1 | 11/2008 | Drozdz et al. | |
| 2009/0118954 A1* | 5/2009 | Wu et al. | 701/60 |
| 2009/0125173 A1 | 5/2009 | Komatsu et al. | |
| 2009/0295335 A1* | 12/2009 | Yang et al. | 320/134 |
| 2010/0062896 A1 | 3/2010 | Falkenstein | |
| 2010/0070123 A1 | 3/2010 | Itoh et al. | |
| 2010/0079111 A1* | 4/2010 | Masuda | 320/134 |
| 2010/0299012 A1* | 11/2010 | Kozarekar | 701/22 |
| 2011/0191059 A1* | 8/2011 | Farrell et al. | 702/130 |
| 2012/0178584 A1* | 7/2012 | Andri | 477/3 |

FOREIGN PATENT DOCUMENTS

| | | |
|---|---|---|
| DE | 103 02 860 | 8/2004 |
| DE | 10302860 | 8/2004 |
| DE | 10 2007 020 935 | 11/2008 |
| DE | 102007020935 A1 * | 11/2008 |
| EP | 0 985 570 | 3/2000 |
| JP | 2003274565 | 9/2003 |
| WO | 2008/034661 | 3/2008 |
| WO | 2008/133247 | 11/2008 |

OTHER PUBLICATIONS

Strunk Jr.. W, White. E.B. The Elements of Style. 3rd ed. New York, Macmillan Publishing Co.., Inc., 1979. pp. 40 PE1408.S772.*
International Search Report, issued in corresponding International Application No. PCT/EP2010/006848.
Office Action issued for Chinese Patent Application 201080055075, mailed Apr. 2, 2014.

* cited by examiner

METHOD AND DEVICE FOR CONTROLLING HYBRID FUNCTIONS IN A MOTOR VEHICLE

FIELD OF THE INVENTION

The present invention relates to a method and a device for controlling hybrid functions in a motor vehicle.

BACKGROUND INFORMATION

Hybrid vehicles are characterized by the combination of an internal combustion engine and an electric motor as motive agents. Usually two types are differentiated, namely, parallel hybrid vehicles and series hybrid vehicles. In the case of series hybrid vehicles, the electric motor and internal combustion engine are permanently linked, whereas in the case of parallel hybrid vehicles, the two drive units may be selected concurrently, as well as each on its own for the drive unit. Moreover, it is conventional to use the electric motor for starting the internal combustion engine in order, among other things, to realize a start-stop function, as well.

German Published Patent Application No. 103 02 860 describes a method and a device for determining a strategy for the operation of a battery, including at least one measuring device, at least one evaluation device as well as a control device; voltage and current as well as at least one further state variable of the battery being measurable by the measuring device; based on the at least one further measured state variable as well as on fixed quantities of the battery and/or quantities derived therefrom, the evaluation device being able to generate a dynamic operating window that defines an operating range of the battery within which the battery can be operated without exceeding or dropping below critical values of state variables of the battery; an instantaneous operating point of the battery being determinable based on the measured voltage and the measured current of the battery; with the aid of the dynamic operating window, at least one limit value of at least one state variable of the battery being determinable as a function of the operating point of the battery within the operating window; and the transmitted limit value being able to be included in the control process of the units operated in connection with the battery. Preferably, at least the temperature is measurable by the measuring device as a further state variable of the battery.

German Published Patent Application No. 102 94 242 describes a drive unit for a vehicle that uses a generator motor, which is activated by an electric current supplied from am accumulator, in order to power a vehicle, and which assists a motive internal combustion engine in a vehicle; including a temperature detector that detects a temperature of the accumulator; a current-value detector which detects the current value input into the accumulator and output from it; a computing device which calculates a permissible current value that may be input into the accumulator and output from it, on the basis of a difference between a temperature of the accumulator and a predetermined upper limit temperature, when the temperature of the accumulator exceeds a threshold temperature; a current-value determining device which determines whether the current value which is input into the accumulator and output from it exceeds the permissible current value; and a command-value corrector which reduces a torque command value of the generator motor when the current-value determining device determines that the current value which is input into the accumulator and output from it exceeds the permissible current value.

SUMMARY

Example embodiments of the present invention provide a method and a device for controlling hybrid functions, by which good overall energy consumption of a motor vehicle is attainable, accompanied by a long battery service life.

The method for controlling hybrid functions in a motor vehicle with the aid of at least one control unit, at least one electric motor and at least one battery, switches off at least one hybrid function above a predetermined battery temperature using the control unit. This is based on the knowledge that the service life of a battery is a function of the battery temperature. By switching off at least one hybrid function, the demand on the battery is thereby limited, thus counteracting a further rise in temperature. In this context, preferably all hybrid functions or at least a plurality of hybrid functions are assigned a battery temperature at which the specific hybrid function is switched off. In so doing, each hybrid function may be assigned its own different battery temperature, or else some or all hybrid functions may be assigned the same battery temperature as a prerequisite for switching off. In particular, hybrid functions are understood to be a start-stop function, electric driving, boost operation (electric drive assistance by the electric motor in addition to the internal combustion engine) and recuperation. The battery temperature may be ascertained both by sensor or else, for example, may be determined from external temperature and load with the aid of model formation. The predetermined battery temperature may be predefined in a fixed manner or else may also be determined during operation, possibly as a function of further parameters, as well.

At least one hybrid function may be restricted continuously or stepwise over a temperature range before the hybrid function is switched off. In this manner, the hybrid function may remain available for a longer time, only the performance range being reduced. In this context, the hybrid function is assigned a first battery temperature as of which the function is restricted, and a second battery temperature as of which the hybrid function is switched off. It may be provided to indicate the restriction and/or shutoff acoustically and/or visually.

The battery temperature at which the hybrid function is restricted or switched off may be selected as a function of a gradient of the battery temperature. The gradient is the change of the temperature in the battery over time, that is, a frequent demand on the battery at short time intervals heats up the battery with a high temperature gradient. The temperature gradient is therefore an indication for how quickly a specific battery temperature is reached. That is why the temperature at which a hybrid function is restricted and/or switched off preferably is lowered in the case of higher gradients, that is, the load of the battery is reduced earlier in order to counteract the further rise in the battery temperature. The temperature gradient may be measured and/or determined in advance based on the energy input into the battery. Preferably, the predetermination in light of the energy input into the battery is carried out based on the battery current (strictly speaking, the square of the current multiplied by the internal resistance of the battery). Due to the high thermal inertia of the battery, the determination in advance, that is, the prediction of the temperature gradient offers the possibility of already predicting a temperature change of the battery before a change appears in the temperature signal.

The hybrid functions may be restricted and/or switched off successively in a predefined sequence. Consequently, especially the energy-saving hybrid functions such as recuperation or electric driving are able to be retained as long as possible to thus further improve the overall energy consumption.

The battery temperature of at least one hybrid function, at which the hybrid function is restricted and/or switched off, may be a function of a selected driving mode. Thus, for example, given the choice possibility between a sporty mode and an energy-saving mode, in the case of the sporty mode, the boost operation may also be available at higher battery temperatures, in which case, preferably other hybrid functions are then restricted earlier. Therefore, the sequence of the restriction and/or shutoff of the hybrid functions may also be altered depending on the driving mode.

Above an upper limit-value temperature, the battery may be cooled by a cooling device, the battery temperature for the use of the cooling preferably being below the battery temperature at which the hybrid functions are restricted and/or switched off. The temperature rise of the battery is thereby limited, so that the hybrid functions are available for a longer time.

Below a lower limit-value temperature, the battery may be warmed up by periodic charging and discharging. This is based on the knowledge that at low temperatures, the performance of the battery is limited, so that strong demands shorten the service life of the battery. Therefore, preferably all or some hybrid functions are switched off below the pre-defined temperature.

For example, the frequency of the charge-discharge cycle may be between 0.1 and 100 Hz, e.g., between 1 and 50 Hz. With rising battery temperature, the frequency of the charge-discharge cycle preferably decreases, since with increasing heating of the battery, stronger demands may be made on it.

The device for controlling hybrid functions in a motor vehicle includes at least one control unit, hybrid functions of a motor vehicle being controlled by the control unit, the control unit switching off at least one hybrid function above a predetermined battery temperature. With regard to the further advantages and developments, reference may be made fully to the explanations concerning the method.

Further features and aspects of example embodiments of the present invention are explained in greater detail below with reference to the appended Figures.

DETAILED DESCRIPTION

Figure 1:
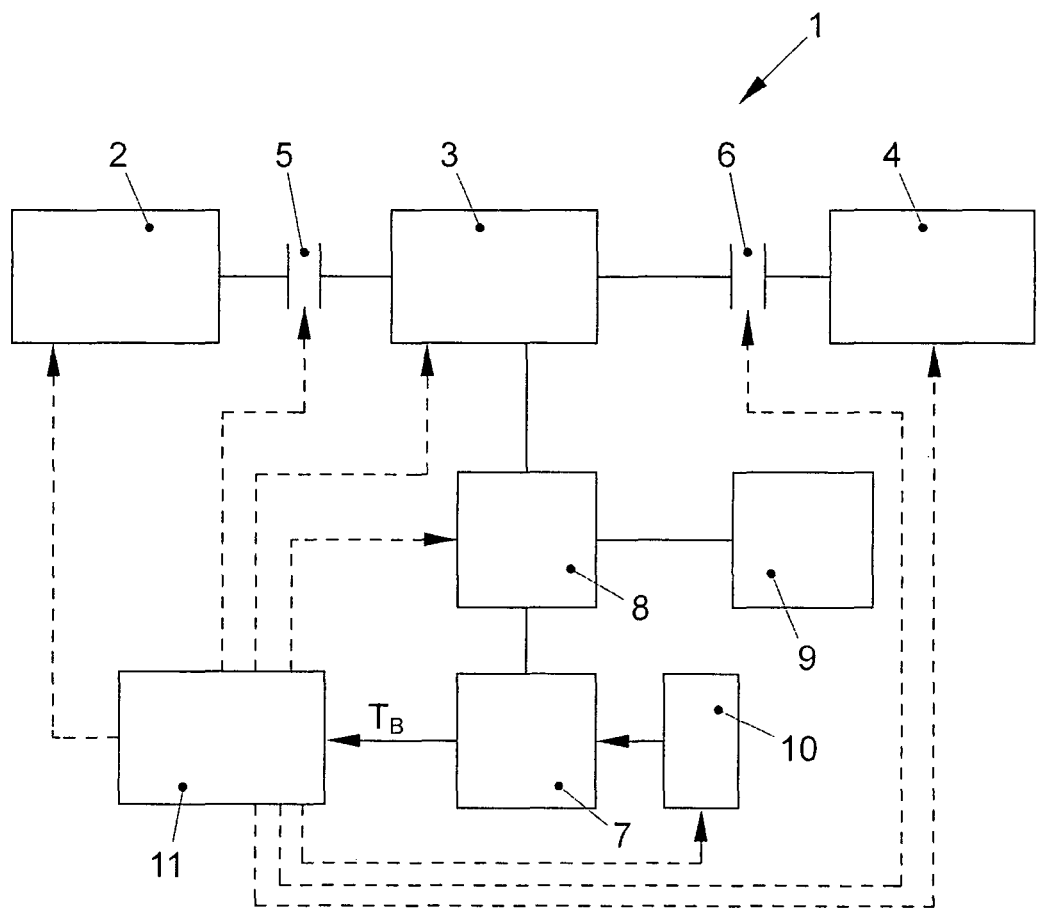
FIG. 1 is a schematic block diagram of a hybrid system in a motor vehicle.

FIG. 1 shows the components of a hybrid system 1 of a motor vehicle. Hybrid system 1 includes an internal combustion engine 2, an electric motor 3 and a transmission 4. A first coupling 5 is disposed between internal combustion engine 2 and electric motor 3. A second coupling 6 is situated between electric motor 3 and transmission 4. Hybrid system 1 further includes at least one battery 7, which is connected to electric motor 3 via power electronics 8. In addition, electric motor 3 is connected via power electronics 8 to an on-board power supply 9 of the motor vehicle. On-board power supply 9 may also be provided with an on-board power-supply battery. In addition, a cooling device 10 is assigned to battery 7. Furthermore, hybrid system 1 includes at least one control unit 11 that controls internal combustion engine 2, electric motor 3, transmission 4, couplings 5, 6 and power electronics 8. In this context, it should be noted that the function of control unit 11 may also be distributed over various control units.

First of all, the hybrid functions will be explained briefly.

During electric driving, coupling 6 is closed and coupling 5 is open. Electric motor 3 is operated in motive-power mode and is supplied with electrical energy via battery 7.

During boosting, coupling 5 is additionally closed, internal combustion engine 2 and electric motor 3 each thereby operating in motive-power mode.

In the case of the start-stop function, internal combustion engine 2 is switched off and is later started again by electric motor 3 operated in motive-power mode, for which coupling 5 is closed.

During recuperation, coupling 6 is closed and electric motor 3 is operated in generator mode, so that the kinetic energy is then converted into electrical energy and used to charge battery 7.

A further function is the charging of battery 7 by internal combustion engine 2 which is operated in motive-power mode, whereas electric motor 3 is operated in generator mode.

During a warm-up function, control unit 11 drives power electronics 8 and electric motor 3 such that the battery is discharged and charged periodically until a lower limit-value temperature $T_g$ of battery 7 of, for example, 10° C. is reached.

As of an upper limit-value temperature $T_K$ of battery 7 of 32° C., for example, cooling device 10 is switched on in order to cool the battery.

Figure 2:
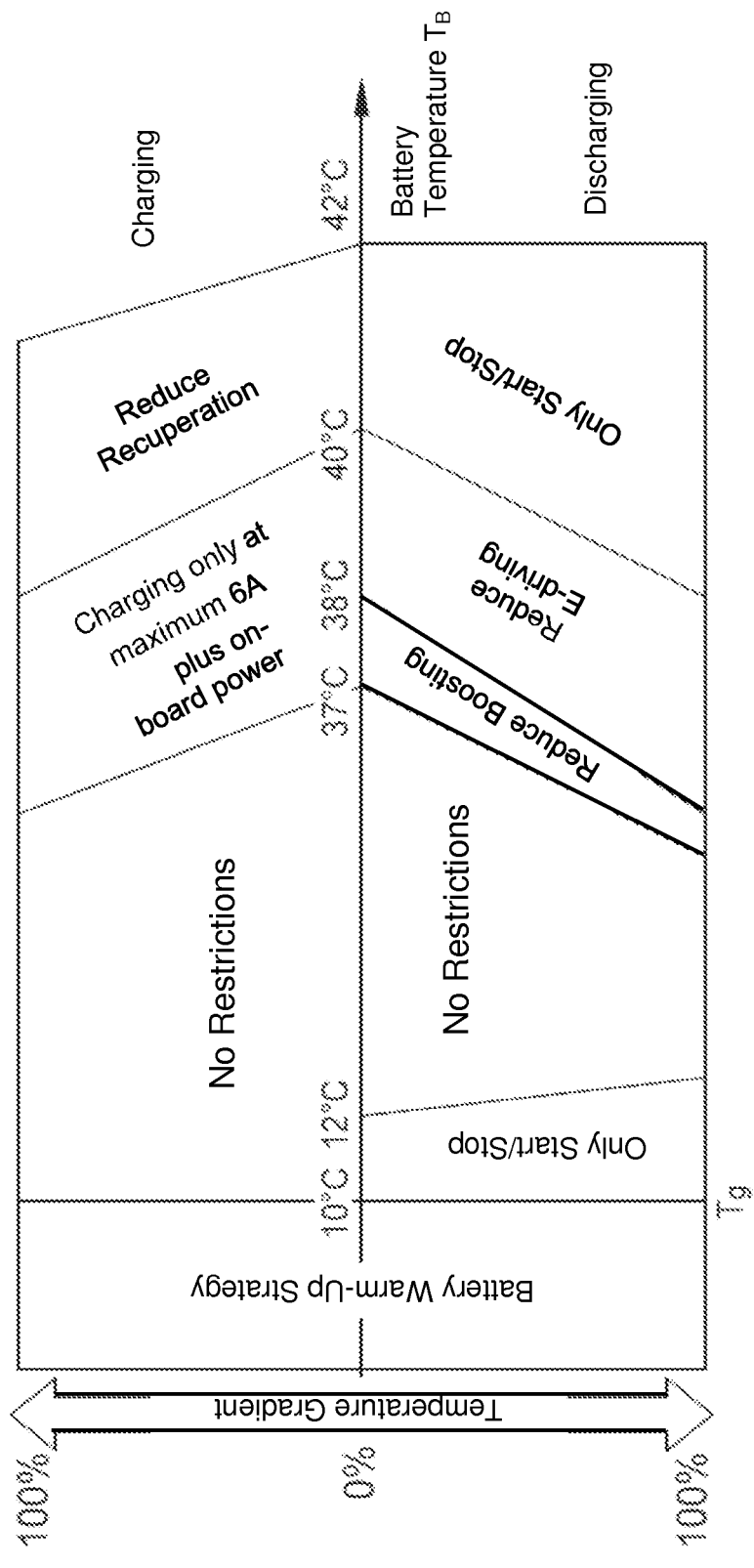
FIG. 2 schematically illustrates a program map of the hybrid functions based on the temperature and the temperature gradient.

The method for controlling the hybrid functions as a function of battery temperature $T_B$ is explained in greater detail with reference to FIG. 2. Battery temperature $T_B$ is plotted on the X-axis, and the time gradient of battery temperature $T_B$ is plotted on the Y-axis. The functional areas of the hybrid functions for charging battery 7 are drawn in above the X-axis, and the functional areas of the hybrid functions for discharging battery 7 are drawn in below the X-axis. First of all, the hybrid functions of charging, given a temperature gradient of 0%, shall be explained. Up to the lower limit-value temperature $T_g$ of 10° C., all hybrid functions are switched off and the battery is warmed up by periodic charging and discharging, the frequency of the charge-discharge cycle decreasing as battery temperature $T_B$ rises. Above lower limit-value temperature $T_g$, there are initially no restrictions with regard to the charging of battery 7 by electric motor 3 driven in generator mode by internal combustion engine 2 or recuperation. As of upper limit-value temperature $T_K$ (not marked in) of 32° C., for example, cooling device 10 is then switched on. If battery temperature $T_B$ then reaches the value 37° C., battery 7 is only charged with a reduced, preferably constant current by electric motor 3, driven in generator mode by internal combustion engine 2. In so doing, besides supplying the preferably constant charging current for battery 7, electric motor 3 also furnishes the current for on-board power supply 9. The constant charging current is especially beneficial for the service life of the battery, a further heating being at least slowed down by the limitation of the charging current. The recuperation hybrid function remains unaffected by this, so that as much recuperation energy as possible continues to be stored in battery 7. If battery temperature $T_B$ reaches 40° C., the charging of battery 7 by electric motor 3, driven by internal combustion engine 2, is switched off, and battery 7 is only charged by recuperation. At battery temperatures $T_B$ between 40° C. and an absolute limit-value temperature of 42° C., the recuperation is restricted in order to reduce the load of battery 7. The restriction may increase continuously or by increments with the battery temperature, or may also be a fixed value. Above 42° C. (the absolute limit-value temperature), there no longer are any hybrid functions. Only on-board power supply 9, that is, the loads, continue to be supplied with electrical energy via electric motor 3. In the case of higher temperature gradients, the hybrid functions are restricted or switched off at low temperatures accordingly.

The functional areas for the hybrid functions of the discharging are represented below the X-axis. Up to lower limit-value temperature $T_g$, again no hybrid functions are active and battery 7 is warmed up by periodic charging and discharging. As of lower limit-value temperature $T_g$, still no electric driving or boosting is possible, although the start-stop function may then be switched on. Start-stop function means that electric motor 3 is used as starter, but applies no drive torque. For the stop case, the internal combustion engine is switched off (e.g., at a traffic light). This may also happen while driving, that is, the vehicle rolls without the internal combustion engine, which is started again immediately upon stepping on the accelerator. As of a battery temperature of 12° C., electric driving and boosting are possible. As of a battery temperature of 37° C., the boosting hybrid function is restricted. The restriction is increased continuously up to a battery temperature of 38° C. At 38° C., the boost function is then switched off. The restriction may be a reduction of the boosting over time and/or a reduction in terms of performance. Upon reaching a battery temperature of 38° C., the electric-driving hybrid function is then restricted continuously up to a battery temperature of 40° C., and is switched off upon reaching this temperature. Between 40° C. and 42° C., only the start-stop function then remains active, which is then also switched off upon reaching the absolute limit-value temperature of 42° C.

The specified temperatures are indicated for example for a nickel-metal-hybrid battery. In the case of lithium ion batteries, the temperature ranges shift accordingly.

LIST OF REFERENCE CHARACTERS 1 hybrid system
2 internal combustion engine
3 electric motor
4 transmission
5 first coupling
6 second coupling
7 battery
8 power electronics
9. on-board power supply
10 cooling device
11 control unit
$T_g$ lower limit-value temperature
$T_K$ upper limit-value temperature
$T_B$ battery temperature

What is claimed is:

1. A method for controlling hybrid functions in a motor vehicle having at least one control unit, at least one electric motor, and at least one battery, comprising:
switching off at least one hybrid function by the control unit above a predetermined battery temperature, wherein the predetermined battery temperature at which the hybrid function is switched off is lowered during a first rate wherein the temperature of the battery has a high rate of change, and is raised during a second rate wherein the temperature of the battery has a lower rate of change relative to the first rate.

2. The method according to claim 1, further comprising restricting continuously or stepwise at least one hybrid function over a battery temperature range before switching off the hybrid function.

3. The method according to claim 2, wherein the battery temperature at which the hybrid function is restricted or switched off is a function of a gradient of the change of battery temperature over time.

4. The method according to claim 1, wherein the hybrid functions are switched off successively in a predefined sequence.

5. The method according to claim 2, wherein the hybrid functions are restricted or switched off successively in a predefined sequence.

6. The method according to claim 1, wherein the battery temperature of at least one hybrid function at which the hybrid function is switched off is a function of a selected driving mode.

7. The method according to claim 2, wherein the battery temperature of at least one hybrid function at which the hybrid function is restricted or switched off is a function of a selected driving mode.

8. The method according to claim 1, further comprising cooling the battery by a cooling device above an upper limit-value temperature.

9. The method according to claim 1, further comprising warming up the battery, by periodic charging and discharging, below a lower limit-value temperature.

10. The method according to claim 9, wherein a frequency of a charge-discharge cycle is between 0.1 and 100 Hz.

11. The method according to claim 9, wherein a frequency of a charge-discharge cycle decreases with rising battery temperatures.

12. The method according to claim 10, wherein a frequency of a charge-discharge cycle decreases with rising battery temperatures.

13. A device, comprising:
at least one control unit adapted to control hybrid functions of a motor vehicle, the control unit adapted to switch off at least one hybrid function above a predetermined battery temperature, wherein the predetermined battery temperature at which the hybrid function is switched off is lowered during a first rate wherein the temperature of the battery has a high rate of change, and is raised during a second rate wherein the temperature of the battery has a lower rate of change relative to the first rate.

* * * * *